(12) United States Patent
Sherman et al.

(10) Patent No.: US 7,627,767 B2
(45) Date of Patent: Dec. 1, 2009

(54) METHODS AND SYSTEMS FOR REMOTELY SECURING DATA IN A WIRELESS DEVICE IN A COMMUNICATIONS NETWORK

(75) Inventors: Stephen Sherman, Alpharetta, GA (US); Robert Koch, Norcross, GA (US); Robert Andres, Marietta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 881 days.

(21) Appl. No.: 11/197,844

(22) Filed: Aug. 5, 2005

(65) Prior Publication Data

US 2006/0031399 A1 Feb. 9, 2006

Related U.S. Application Data

(63) Continuation-in-part of application No. 10/881,669, filed on Jun. 30, 2004.

(51) Int. Cl.
G06F 11/30 (2006.01)
G06F 12/14 (2006.01)
G06F 13/24 (2006.01)

(52) U.S. Cl. .................. 713/189; 713/182; 710/263

(58) Field of Classification Search ............. 713/182, 713/189; 710/263
See application file for complete search history.

(56) References Cited

U.S. PATENT DOCUMENTS

| | | | |
|---|---|---|---|
| 5,987,609 A | 11/1999 | Hasebe | 726/35 |
| 6,480,096 B1 | 11/2002 | Gutman et al. | 340/5.31 |
| 6,662,023 B1 * | 12/2003 | Helle | 455/558 |
| 6,813,498 B1 * | 11/2004 | Durga et al. | 455/456.1 |
| 7,024,698 B2 | 4/2006 | Tanaka et al. | 726/26 |
| 7,184,750 B2 | 2/2007 | Tervo et al. | 455/410 |
| 2002/0086672 A1 * | 7/2002 | McDowell et al. | 455/432 |
| 2002/0112046 A1 | 8/2002 | Kushwaha et al. | 709/223 |
| 2003/0040325 A1 * | 2/2003 | Clark | 455/461 |
| 2004/0203601 A1 | 10/2004 | Morriss et al. | 455/411 |
| 2005/0221800 A1 * | 10/2005 | Jackson et al. | 455/411 |
| 2006/0031541 A1 | 2/2006 | Koch et al. | 709/229 |
| 2007/0064636 A9 | 3/2007 | Koch et al. | 370/310.2 |

OTHER PUBLICATIONS

U.S. Final Office Action dated May 8, 2008 cited in U.S. Appl. No. 10/881,669.
U.S. Office Action dated Nov. 7, 2007 cited in U.S. Appl. No. 10/881,669.

* cited by examiner

*Primary Examiner*—Christopher J Brown
(74) *Attorney, Agent, or Firm*—Mozzam & Associates, LLC

(57) ABSTRACT

Methods and systems are provided for remotely securing data in a wireless device. A user sends a data message containing instructions for securing data to a remotely located wireless device. Securing data includes recovering data, purging data, locking the wireless device, and locating the wireless device within a communications network. After the data message is sent, a determination is then made as to whether the wireless device is active in the communications network. If the wireless device is active, the data message is sent to the wireless device. If the wireless device is inactive, the data message is temporarily stored in a database until the wireless device is determined to be active. An application program resident on the wireless device is executed upon receiving the data message to secure the data. The data message also includes instructions for retrieving data for identifying an owner of the wireless device.

13 Claims, 5 Drawing Sheets

METHODS AND SYSTEMS FOR REMOTELY SECURING DATA IN A WIRELESS DEVICE IN A COMMUNICATIONS NETWORK

CROSS-REFERENCE TO RELATED APPLICATIONS

This patent application is a continuation-in-part of U.S. patent application Ser. No. 10/881,669, entitled "System And Methods For Remotely Recovering And Purging Data From A Wireless Device In A Communications Network," filed on Jun. 30, 2004 and assigned to the same assignee as this application. The aforementioned patent application is expressly incorporated herein by reference.

TECHNICAL FIELD

The present invention relates to data communications. More particularly, the present invention is related to remotely securing data in a wireless device in a communications network.

BACKGROUND OF THE INVENTION

Wireless devices for communicating and storing voice and data are becoming commonplace. Users of wireless communication devices are increasingly using their wireless devices to send electronic mail ("E-mail") as well as store personal data, such as contact lists, calendar information, to do lists, and other notes. Much of this data may be considered as private to a user (e.g., passwords, credit card or bank account numbers, telephone numbers, addresses, and calendar or schedule information) and may result in undesirable consequences for the user if the wireless device is lost and falls into the wrong hands.

Many wireless communication devices permit the user to enable a software lock of the device, which prevents use of the device unless a password is entered, and thus protects user data. However, use of this locking feature typically requires additional steps that the user might otherwise not wish to take in operating their device, such as remembering and entering a multi-digit code every time the device is turned on or when an attempt is made to access the user's private data. As a result, the wireless device's locking feature is frequently unused. Moreover, if a device is stolen or lost, even if the locking feature is in place, the user suffers the inconvenience of losing his or her data and wondering if the device had been previously locked.

SUMMARY OF THE INVENTION

In accordance with illustrative embodiments of the present invention, the above and other problems are addressed by systems and methods for remotely securing data from a wireless device in a communications network. Securing data includes recovering data from the wireless device, purging data from the wireless device, locking the wireless device, and locating the wireless device within a communications network.

According to an embodiment, a user sends a data message containing instructions for securing data to a remotely located wireless device. A determination is then made as to whether the wireless device is active (i.e., turned on and registered for service) in the communications network. If the wireless device is active, the data message is sent to the wireless device. If the wireless device is inactive, the data message is temporarily stored in a database until the wireless device is determined to be active and then sent to the wireless device. An application program resident on the wireless device is executed upon receiving the data message. The data message may include instructions for recovering user data, purging user data, locking the wireless device, and locating the wireless device. Once the user data has been recovered from the wireless device, the application program generates a return message including the recovered data. The message may also include instructions for retrieving an owner information file, which contains data identifying an owner of the wireless device from the communications network, to be executed on the wireless device.

Embodiments of the invention may be implemented as systems which include a computer process executed on a wireless device, computing apparatus, or as articles of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION OF THE INVENTION

Figure 1:
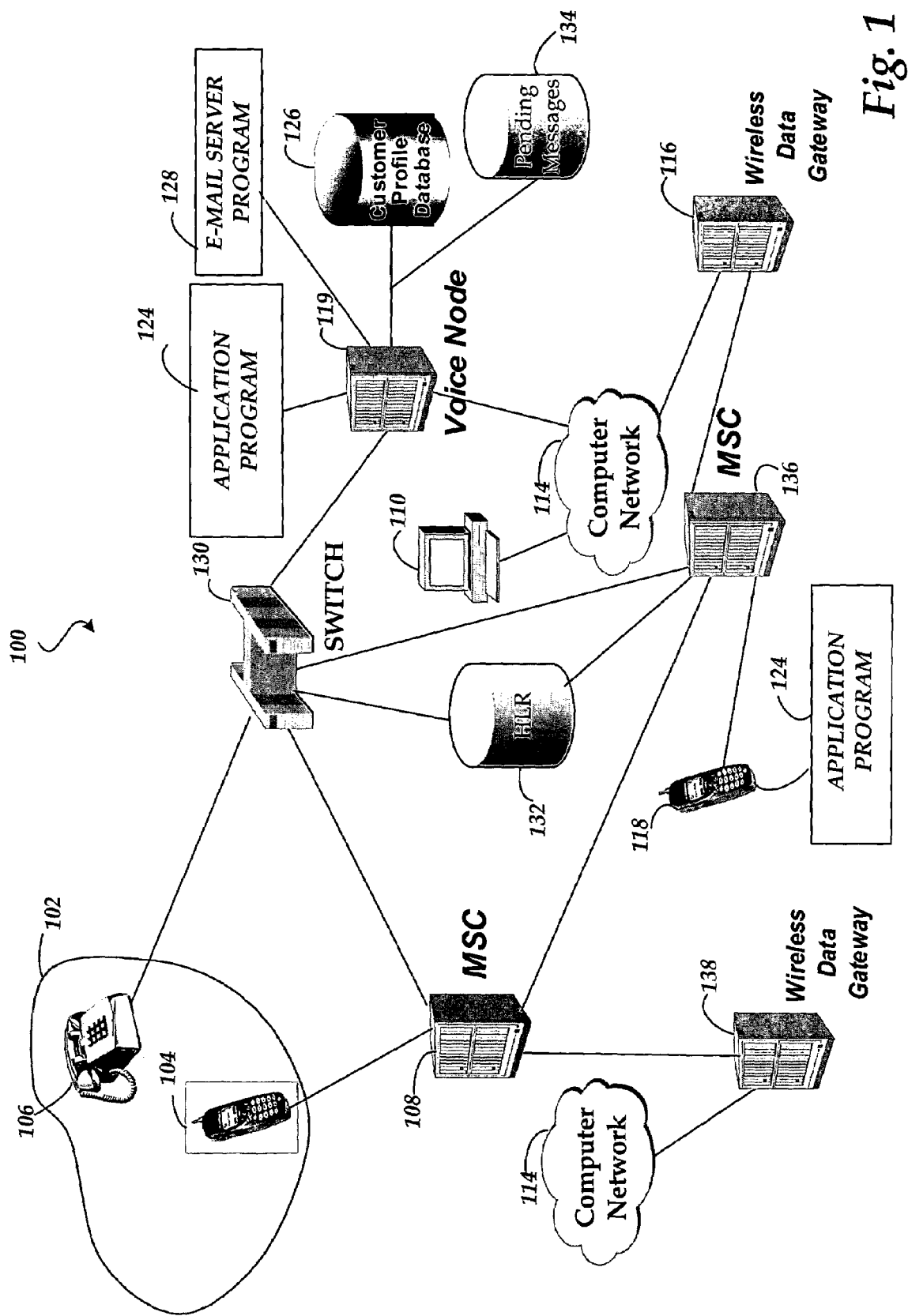
FIG. 1 is a network diagram illustrating aspects of a voice communications network utilized in and provided by the various illustrative embodiments of the invention.

In accordance with the present invention, systems and methods are provided for remotely securing data in a wireless device in communication with a data network. Referring now to the drawings, in which like numerals represent like elements, various aspects of the present invention will be described. In particular, FIG. 1 and the corresponding discussion are intended to provide a brief, general description of a suitable communications network environment in which illustrative embodiments of the invention may be implemented.

Referring now to FIG. 1, an illustrative communications network for performing an illustrative embodiment of the invention will be described. As shown in FIG. 1, a communications network 100 includes communications devices 102 for conducting voice and data communications with a switch 130. According to illustrative embodiments of the invention, the switch 130 may be a standard central office circuit switch or a softswitch for routing voice and data traffic. The communications devices 102 may include a standard wireline telephone set 106 which is connected via a subscriber line to the switch 130. The communications devices 102 also include a wireless device such as wireless telephone 104 which is in wireless communication with a mobile switching center ("MSC") 108 which serves the wireless telephone 104. The MSC 108 is utilized to route wireless voice traffic from the wireless telephone 104 to the switch 130 via a wireline connection. The MSC 108 is also in communication with a second MSC 136 which also serves a wireless device, shown as wireless telephone 118.

It should be understood that the wireless telephone 118 (and optionally the wireless telephone 104) includes having "smart phone" functionality. As will be appreciated by those skilled in the art, smart phones combine the functions of a conventional mobile phone with functionality typically included in a personal or hand-held computer. This functionality includes the capability of saving data, executing software application programs, sending and receiving e-mail and instant messages, and accessing Web pages over the Internet. The wireless telephones 104 and 118 may send and receive data messages over a network, such as computer network 114, through communication with wireless data gateways 116 and 138. The wireless data gateways 116 and 138 convert data communicated over a wireless data network so that it may be communicated over the computer network 114. Wireless data gateways are well known to those skilled in the art. It should be appreciated that the computer network 114 may include any type of computing network, including a local area network or a wide area network, such as the Internet.

According to illustrative embodiments of the invention, the wireless telephone 118 is further operative to execute an application program 124. The application program 124 is utilized to secure data in the wireless telephone 118, e.g., upon the device becoming lost or stolen. As used herein, "securing data" includes recovering user data from a wireless device, purging data, locking a wireless device, and locating a wireless device in a communications network. The application program 124 is executed or invoked upon receiving a message from either of the communications devices 102. The message contains request data for identifying a lost wireless device, recovering saved data, purging saved data, recovering and then purging the saved data, locking the wireless device, locating the wireless device, and other instructions. The request data may also contain a return address, such as an e-mail address, for sending the recovered data and/or confirmation of a data purge to the wireless telephone 104 or to computer 110. The functions of the application program 124 will be discussed in greater detail below with reference to FIGS. 3 and 4.

In an illustrative embodiment of the invention, the switch 130, the wireline telephone set 106, and the connections between them are elements in an Advanced Intelligent Network ("AIN"), while the MSCs 108 and 116, the wireless telephone 104, the wireless telephone 118, and the wireless data gateway 116 are elements in a wireless network in communication with the AIN. As is well known to those skilled in the art, the modern public switched telephone network ("PSTN") has separate signaling paths for voice signals (or other customer-utilized communication circuits) and for control signals, which include information transmitted throughout the network to control the connection and disconnection of the voice circuits. The AIN uses the signaling system 7 ("SS7") network for signal or system control message transport. The components of the AIN and the SS7 communications protocol are well known to those skilled in the art and are described in U.S. Pat. No. 5,245,719 to Weisser entitled "Mediation of Open Advanced Intelligent Network Interface by Shared Execution Environment" and in the document entitled "Bell Communications Research Specification of Signaling System 7," Document TR-NWT-000246, Issue 2 (June 1991), plus Revision 1 (December 1991). The aforementioned documents are incorporated herein by reference.

As discussed above, the MSCs 108 and 116, the wireless telephone 104, and the wireless telephone 118 are elements in a wireless network in communication with the AIN. The MSCs 108 and 116 may be connected to one or more Signal Transfer Points ("STPs") to provide information to the wireline network and receive information from the wireline network. As is well known to those skilled in the art, the signaling protocol used between the components of the wireless network may include the interim standard 41 ("IS-41"). The IS-41 standard defines the processes by which wireless providers accomplish signaling between the MSCs 108 and 116 and other devices for purposes of intersystem handoff and automatic roaming.

The MSC's 108 and 116, as well as the switch 130 are in communication with a Home Location Register ("HLR") 132. As is known to those skilled in the art, the HLR 132 is a wireless telecommunications component which includes a permanent SS7 database used in cellular networks including the advanced mobile phone system, the global system for mobile communications and the personal communications system ("PCS"). The HLR 132 may be used to identify and verify a subscriber and includes subscriber data related to features and services subscribed to. In particular, the HLR 132 "registers" a wireless telephone for service by creating a record in the SS7 database whenever the wireless telephone is turned on and is located within a wireless service area where calls may be routed to the wireless telephone. The HLR 132 is also used to verify the legitimacy and features subscribed to by a given subscriber when the subscriber is roaming outside of an area of coverage supported by a given wireless provider. Under roaming conditions, a local service provider may query the HLR of another wireless telecommunications service provider via an SS7 data link. Once information on the subscriber is verified, data on the subscriber may be transferred via the SS7 link to the HLR of the local service provider in which the subscriber is roaming.

The communications network 100 also includes a voice node 119 in communication with the switch 130, the computer network 114, a customer profile database 126, and a pending messages database 134. According to illustrative embodiments of the invention, the voice node 119 is a server computer with interactive voice response ("IVR") functionality. The voice node 119 is operative to execute the application program 124 and an e-mail server program 128. According to illustrative embodiments of the invention, the voice node 119 is utilized to receive a voice call to a special directory number from the switch 130 for locating a lost or stolen wireless device in the communications network 100. The application program 124 is executed or invoked upon by the voice node 119 for retrieving information from the database 126 associated with a wireless directory number for the lost or stolen wireless device. The application program 124 receives this information and generates a message to send to the wireless telephone 118 utilizing the e-mail server program 128. Prior to sending the message to the wireless telephone 118, the voice node 119 is configured to communicate with the HLR 132 (through the switch 130) to determine the registration status of the wireless telephone 118. If the HLR 132 indicates that the registration of the wireless telephone is inactive (i.e., turned off or out of a wireless service coverage area), then the voice node 119 stores the message in the pending messages database 134 until the wireless telephone is determined to be active. If the HLR 132 indicates that the registration status of the wireless telephone 118 is active (i.e., turned on), the e-mail server program 128 sends the message over the computer network 114 to a copy of the application program 124 executed on the wireless telephone 118. As previously discussed with respect to the wireless telephone 118 in the description of FIG. 1, the wireless device 118 may include smart phone functionality to enable the execution of the application program 124 as well as other software application programs.

Figure 2:
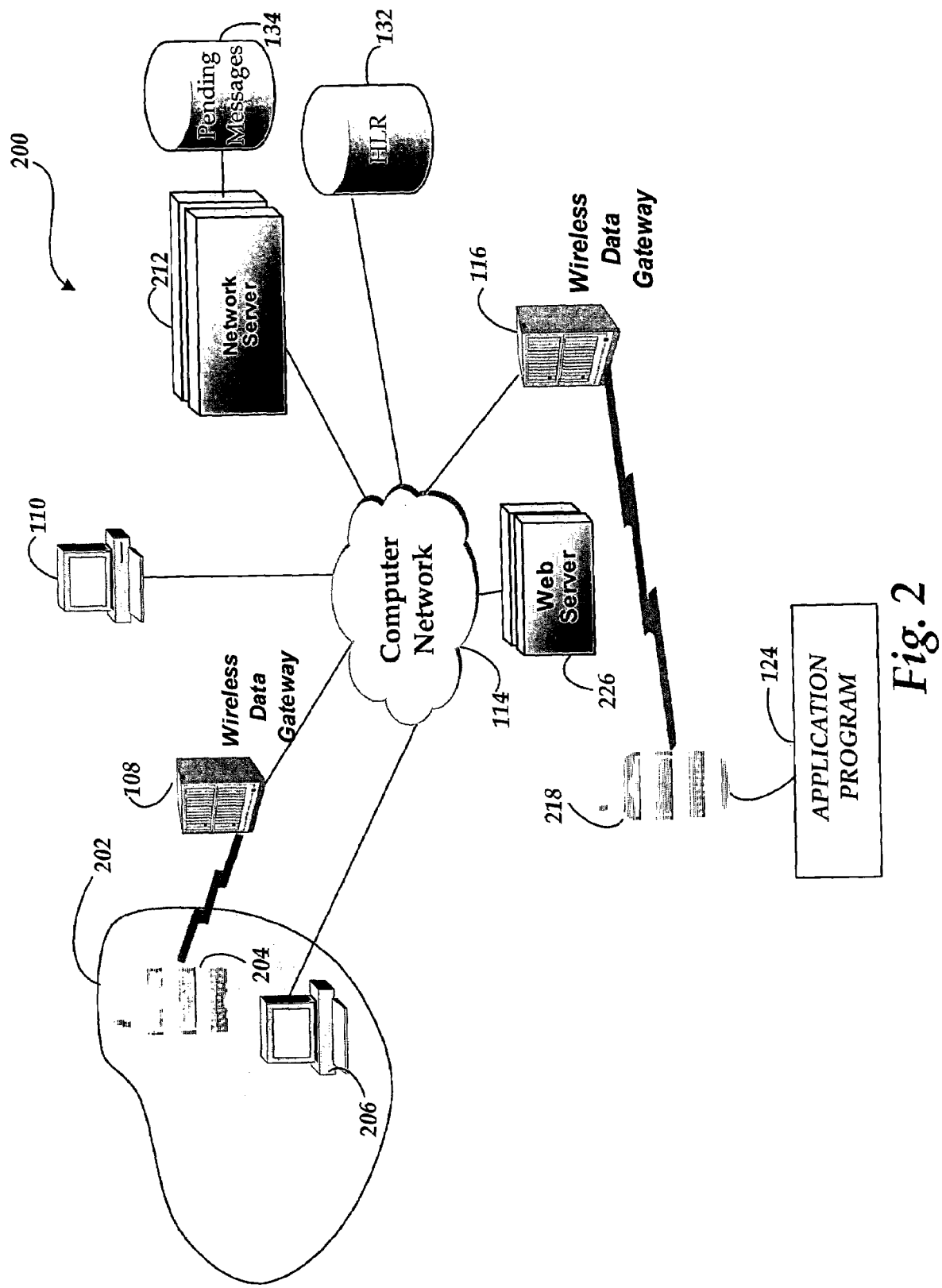
FIG. 2 is a network diagram illustrating aspects of a data communications network utilized in and provided by the various illustrative embodiments of the invention.

Referring now to FIG. 2, an illustrative data communications network 200 for performing an illustrative embodiment of the invention will be described. The data communications network includes many of the components discussed above with respect to the communications network 100 in FIG. 1 including the wireless data gateways 108 and 116, the computer 110, the computer network 114, the HLR 132, the pending messages database 134, and the application program 124. The network 200 also includes communications devices 202, which include a wireless hand-held computer 104 and a personal computer 106, a network server 212, a web server 226, and a wireless device 218.

According to an illustrative embodiment, the wireless hand-held computer 204 utilizes the wireless data gateway 108 to send and receive data messages over the computer network 114. As will be described in greater detail below, the communications devices 102 may be utilized to send data messages for securing data in wireless device 218, over the computer network 114. The data messages may include, for instance, electronic mail ("e-mail") messages, short message service ("SMS") messages, text messages, or any other message types known to those skilled in the art which may be communicated in a communications network.

The computer network 114 interconnects communications devices 202 with the network server 212, the HLR 132, the wireless device 218, and the web server computer 226 which delivers web pages to connected devices. The wireless device 218 may be a hand-held computer with smart phone functionality for communicating over a wireless communications network. The wireless device 218 sends and receives data messages over the computer network 114 through communication with wireless data gateways 108 and 116. The wireless device 218 is operative to execute the data recovery/purge application 124.

In various illustrative embodiments, the network server 212 acts as a node for receiving data messages from the communications devices 202, for storing the data messages in the pending messages database 134, and for communicating with the HLR 132 to determine an operational status of the wireless device 218. In particular, and as will be described in greater detail below, the network server 212 receives messages for securing data in the wireless device 218 and queues the messages until the operational status of the wireless device 218 is determined (i.e., whether the wireless is active and registered) from the HLR 132. If the wireless device 218 is determined to be active, then the network server 212 communicates the queued message to the wireless device 218 for processing by the application program 124. If the wireless device 218 is not determined to be inactive, then the network server 212 stores the messages in a pending messages database until the wireless device 218 is determined to be active.

It will be appreciated that the illustrative embodiments of the invention, in addition to being implemented in the voice and data communications networks discussed above with respect to FIGS. 1 and 2, may also be implemented in other types of networks including but not limited to VoIP, cable, and wireless-only networks. Those skilled in the art will also appreciate that the illustrative embodiments of the invention are not limited to the hand-held computer 204 or the personal computer 206, but may be practiced with other communications devices including, but not limited to, two-way paging devices, personal digital assistants ("PDAs"), voice over Internet protocol ("VOIP") or Internet telephones, microprocessor-based or programmable consumer electronics, minicomputers, mainframe computers, and the like.

Figure 3A:
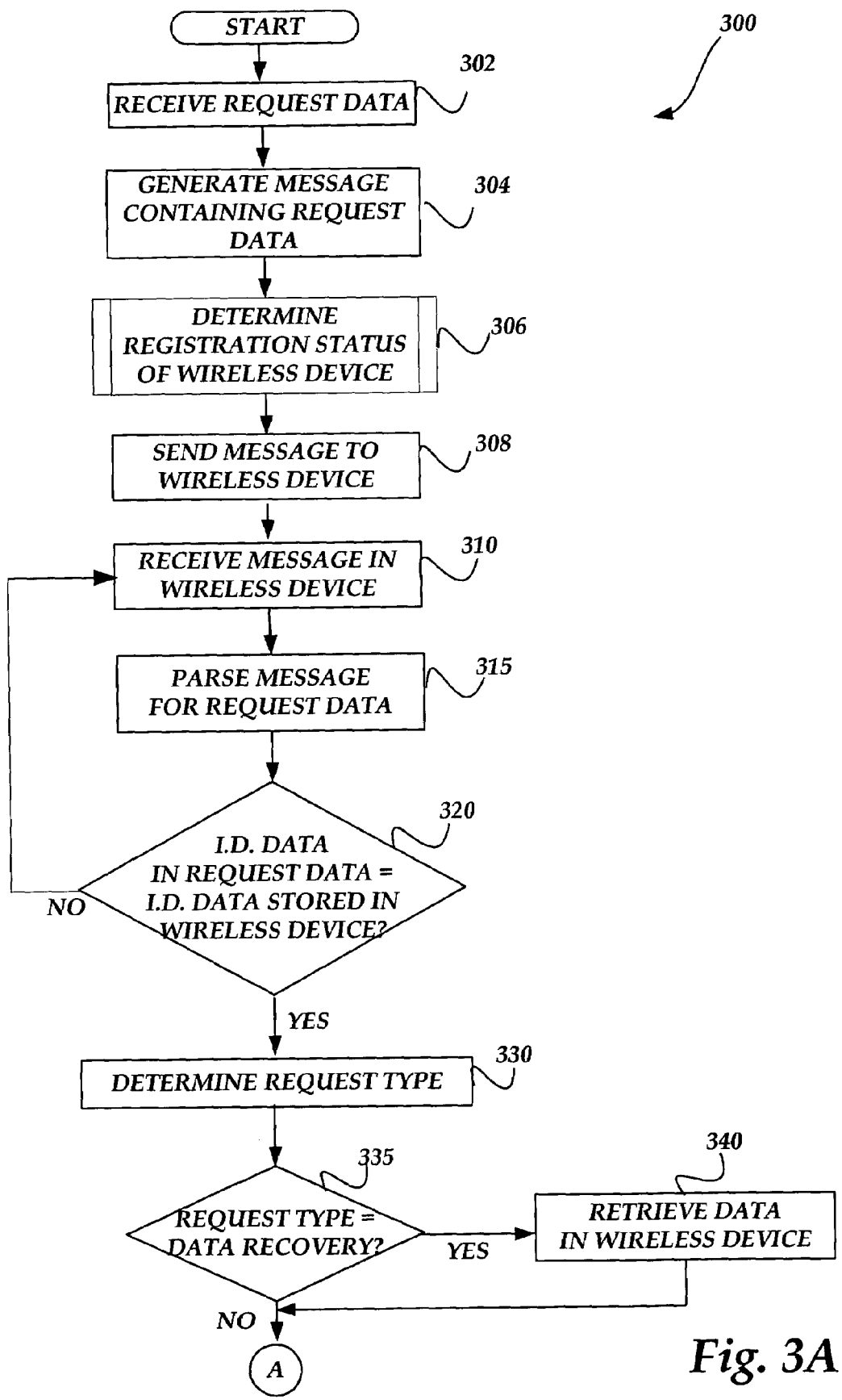
FIG. 3A is a flow diagram illustrating aspects of a process for securing data and performing other operations with respect to a wireless device in the communications networks of FIGS. 1 and 2, according to illustrative embodiments of the invention.

Referring now to FIG. 3A, a routine 300 will be described illustrating a process that may be performed by the application program 124 for securing data in a wireless device. When reading the discussion of the routines presented herein, it should be appreciated that the logical operations of various illustrative embodiments of the present invention may be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 3A, 3B, and 4, and making up the illustrative embodiments of the present invention described herein are referred to variously as operations, structural devices, acts, or modules. It will be recognized by one skilled in the art that these operations, structural devices, acts, and modules may be implemented in software, in firmware, in special purpose digital logic, and any combination thereof without deviating from the spirit and scope of the present invention as recited within the claims set forth herein.

The routine 300 begins at operation 302, wherein the voice node 119 receives a request from a user of either of the communications devices 102 to execute the application program 124 resident in a wireless device (e.g., wireless telephone 118). In particular, a user in the communications network 100 may initiate a request by making a voice call to the voice node 119. Upon the completion of the call, the voice node 119 generates synthesized voice prompts for request data including identification data such as the telephone number of the wireless device and the type of request or requests (e.g., data recovery, data purge, device lock, or device location). Once this information is received, the voice node 119 accesses the customer profile database 126 to retrieve additional request data which may include a return address, such as an e-mail address, for sending the recovered data and/or confirmation of a data purge, wireless device lock, or wireless device location information. The customer profile database 126 may also include instructions for accessing an owner information file, which includes owner information, to be executed on the wireless device in response to the execution of the application program 124. The instructions may include, for example, the location of an owner information file in the communications network to be downloaded and executed on the wireless device or, in the alternative, the retrieval of the owner information file stored in the memory of the wireless device.

From operation 302, the routine 300 continues to operation 304 where the voice node 119 executes the application program 124 which receives the additional request data stored in the customer profile database 126 and generates an e-mail message containing all of the request data (i.e., the user initiated request data and the request data retrieved from the customer profile database 126). It should be understood that the operation 304 may also be performed in the communications network 200 discussed above with respect to FIG. 2. In the communications network 200, the network server 212 receives a data message (via an e-mail message or web page) including the request data discussed above for communication to the wireless device 218. From operation 304, the routine 300 continues to operation 306 where the voice node 119 (or alternatively the network server 212) determines the registration status of the wireless device as will be described in greater detail below with respect to FIG. 4.

Figure 4:
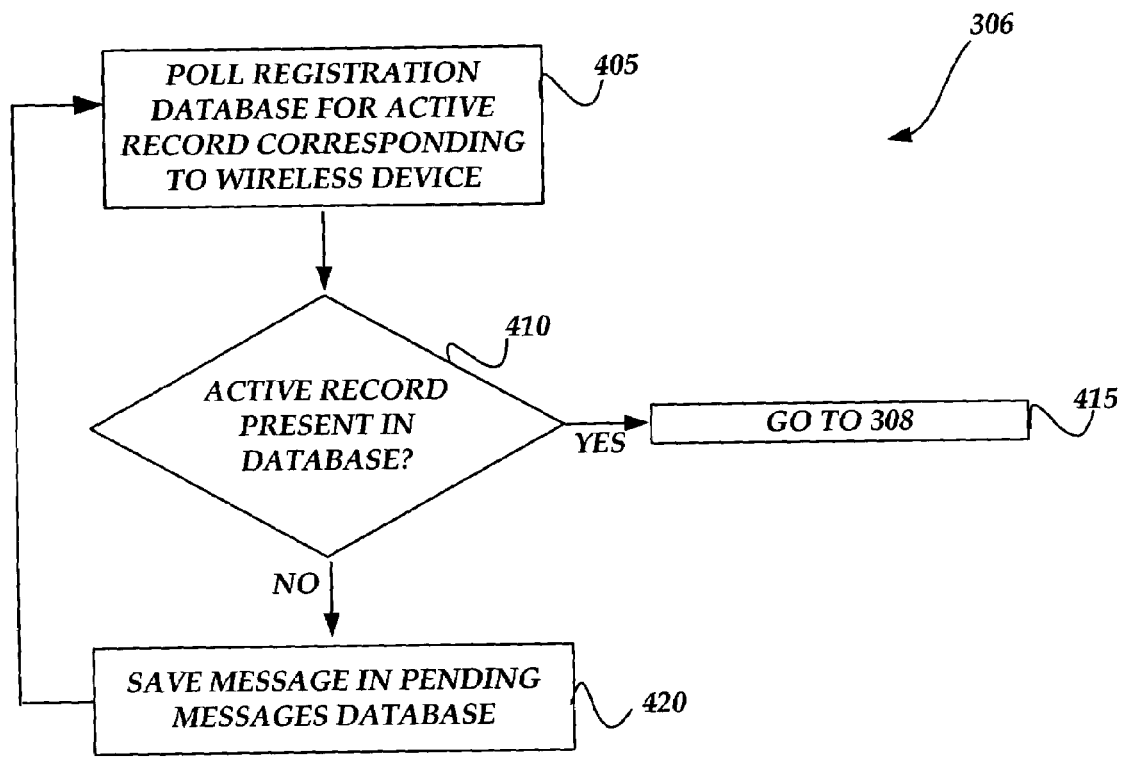
FIG. 4 is a flow diagram illustrating aspects of a process for determining the registration status of a wireless device for which a data recovery request has been made in the communications networks of FIGS. 1 and 2, according to illustrative embodiments of the invention.

Turning now to FIG. 4, the operation 306 includes operation 405 where the voice node 119 (or alternatively the network server 212) polls a registration database for an active record corresponding to the wireless device. In particular, the voice node 119 may be configured to instruct the switch 130 to communicate with the HLR 132 in the communications network 100 (discussed above in FIG. 1) to determine if the HLR 132 database contains a record indicating that the wireless device registered for service with the MSC 136 (i.e., an active record). In particular, the switch 130 may communicate the telephone number of the wireless device to a service control point (not shown) in the communications network 100. The service control point may then transmit an IS-41 location request to the HLR 132 to obtain the registration status of the wireless device. It will be appreciated that, instead of the service control point, the query for the status of the wireless device may also be directed to the MSC 136 (through the MSC 108) to the HLR 132 using the IS-41 signaling protocol. Once the registration status of the wireless telephone 118 has been retrieved from the HLR 132, the status information is communicated from the switch 130 back to the voice node 119. In the communications network 200, the network server 212 may be configured to communicate directly with the HLR 132 over the computer network 114 to determine if the database contains a record indicating that the wireless device 218 is registered for service.

From operation 405, operation 306 continues to operation 410 where the voice node 119 (or the network server 212) receives the status information and, if the status information indicates that there is an active record for the wireless device in the HLR 132 (i.e., indicating that the wireless device is turned on), operation 306 continues from operation 410 to operation 415 and returns to operation 308 of the routine 300 in FIG. 3A. If, however, the status information indicates that there is not an active record for the wireless device the HLR 132 (i.e., indicating that the wireless device is turned off, contains a dead battery, or is outside a service area), then operation 306 continues from operation 410 to operation 420 where the voice node 119 (or the network server 212) saves the message containing the request data for the wireless device in the pending messages database 134. The operation 306 then returns to operation 405 where the voice node 119 (or the network server 212) continues to initiate polling of the HLR 132 database until an active record is found for the wireless device.

It will be appreciated that the voice node 119 (or the network server 212) may be configured to poll the HLR 132 database periodically in an interval (e.g., every hour) defined by the owner of the wireless device and that the polling may be terminated after a predetermined number of polling intervals has elapsed. It should be understood that information relating to the polling intervals may be included in the request data input by the user when initiating a request for securing data or included in the additional request data stored in the customer profile database 126.

The routine 400 continues from operation 415 to operation 308 in FIG. 3A where the application program 124 executing in the voice node 119 sends the e-mail message containing the request data generated by the e-mail server program 128 to the application program 124 resident in the wireless device over the computer network 114. In particular, the e-mail message may include a form comprising a number of fields of request data including a key field indicating a unique identification (such as the wireless telephone number) of the wireless device being contacted, a request type field indicating the type of operation to be performed by the recovery/data purge application 124 resident in the wireless device, and a data recovery address which may be an e-mail address for sending recovered data, a purge confirmation, or other data to the invoking party. Alternatively, the message may also take the form of a wireless text message such as an SMS message in addition to various other types of wireless and wireline messaging known to those skilled in the art.

From operation 308, the routine 300 continues to operation 310 where the message is received at the wireless device at which time the application program 124 resident in the wireless device is executed. For instance, the wireless device may be preconfigured (i.e., preprogrammed) to automatically execute the application program 124 each time an e-mail message is received. Once executed the application program 124 determines if the received message includes request data as described in detail at operation 315.

From operation 310, the routine 300 continues to operation 315 where the application program 124 parses the received message from the invoking party for request data indicating a request to secure data in the wireless device. In particular, the application program 124 may be configured to search for request data fields in an e-mail message. For instance, the application program 124 may initially search for the key field to confirm that the request data in the message is applicable to the wireless device.

From operation 315, the routine 300 continues to operation 220 where the application program 124 compares identification information in the request data to identification data previously stored in the device. In particular, the application program 124 may search for an identification number in the key field in the request data. The identification number may include, for instance, the wireless telephone number of the wireless device, the social security number of the owner, or a numerical pass code.

If, at operation 320, the application program 124 determines that the identification data does not match the identification data stored in the wireless device 118, the routine 300 branches to operation 310 where the application program 124 waits to receive another message. Upon determining a non-match of the identification data, the application program 124 may further be configured to generate an alert in a return message to the computer 110 associated with the invoking party indicating that the sent identification data does not match the identification data in the wireless device.

If, at operation 320, the application program 124 determines that the identification data matches the identification data stored in the wireless device, the routine 300 continues to operation 330. At operation 330, the application program 124 determines the type of request contained in the request data in the received message from the invoking party. For instance, the application program 124 may search a request type field in the received message to identify whether a request was made to recover personal contact data stored in the wireless device.

From operation 330, the routine 300 continues to operation 335 where the application program 124 determines whether the request data includes a request to recover the data stored in the wireless device. If the request data includes a request to recover the data stored in the wireless device, the routine 300 continues to operation 340 where the application program 124 retrieves the data stored in the wireless device. In particular, the application program 124 accesses the memory in the wireless device and initiates appropriate commands to make a copy of the stored data. For instance, the application program 124 may be configured to copy a user's personal data, such as telephone and address data, calendar information, passwords, and account numbers from the wireless device into a data file. If, at operation 335, the application program 124 determines that the request data does not include a request to recover the data stored in the wireless device, the routine 300 continues to operation 345 in FIG. 3B.

Figure 3B:
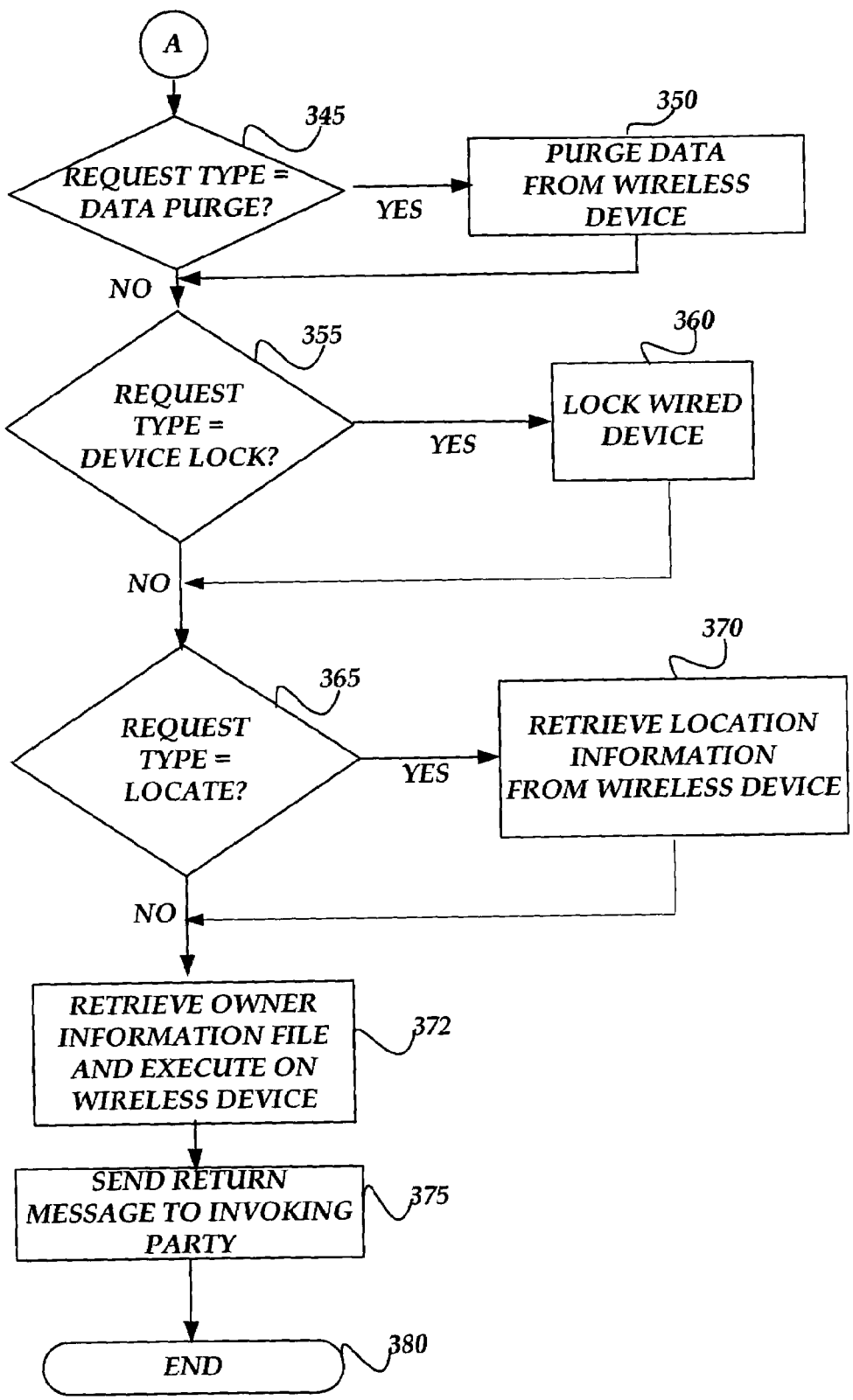
FIG. 3B is a flow diagram continuing the process of FIG. 3A, according to illustrative embodiments of the invention.

Referring now to FIG. 3B, at operation 345, the application program 124 determines whether the request data includes a request to purge the data stored in the wireless device. If the request data includes a request to purge the data stored in the wireless device, the routine 300 continues to operation 350 where the application program 124 purges data stored in the wireless device. In particular, the application program 124 executes a delete command from a menu in the wireless device to purge the stored data. It should be understood that the data purged from the device may include personal information such as calendar information, to do lists, notes, passwords, account numbers, telephone numbers, addresses, and calendar or schedule information, as well as message log data of incoming and outgoing telephone calls, text messages, e-mail messages, etc. The routine 300 then continues to operation 355. If, at operation 345, the application program 124 determines that the request data does not include a request to purge the data stored in the wireless device, the routine 300 continues to operation 355.

At operation 355, the application program 124 determines whether the request data includes a request to lock the wireless device. If the request data includes a request to lock the wireless device, the routine 300 continues to operation 360 where the application program 124 locks the wireless device. In particular, the application program 124 may access a menu in the wireless device and enter a numerical code, provided in the request data, to lock the device so that device functions and data are prevented from being accessed by an unknown party. The routine 300 then continues to operation 365.

If the request data does not include a request to lock the wireless device, the routine 300 continues to operation 365 where the application program 124 determines whether the request data includes a request to locate the wireless device. If the request data includes a request to locate the wireless device, the routine 300 continues to operation 370 where the application program 124 executing on the wireless device retrieves location information. In particular, the application program 124, in response to receiving a request for location information, is configured to access a menu in the wireless device to retrieve location data, such as Global Positioning System ("GPS") data (if the wireless device includes this feature). The routine 300 then continues to operation 372.

If the request data does not include a request to lock the wireless device, the routine 300 continues to operation 372 where the application program 124 retrieves the instructions for accessing the owner information file. For instance, the owner information in the owner information file may contain an "If Lost" entry including a name, mailing address, and e-mail address for returning the wireless device to its owner. In one illustrative embodiment of the invention, the instructions for accessing the owner information file may include a special telephone number which will initiate a download of the owner information file from a wireless service provider directly to the wireless device which will then be automatically executed on the wireless device. It will be appreciated by those skilled in the art that this functionality may be implemented by over-the-air ("OTA") programming. In particular, via OTA programming, wireless devices are capable of receiving and immediately using new programming without having to be physically connected to a configuration device. As is known to those skilled in the art, OTA programming enables service providers to alter the software of wireless devices by having users call a special number. Once the phone contacts the provider, new firmware and software may be automatically transferred to the wireless device, installed, and put into use. In another illustrative embodiment of the invention, the instructions for accessing the owner information file may include directing the wireless device to load the owner information file from the telephone's memory for execution. In particular, the application program 124 may be configured to access a menu in the wireless device for retrieving owner information files stored on the device.

Once the owner information file is retrieved, the file is executed to present the owner information on the wireless device. In accordance with illustrative embodiments, the owner information file may be a static graphics file (such as a computer wallpaper file), an audio file, or a video file for presenting the owner information.

From operation 372, the routine 300 continues to operation 375 where the application program 124 sends a return message to the invoking party. In particular, the application program 124 may initiate and send an e-mail message from the wireless device over the computer network 114 to the data recovery address linked to the invoking party in the customer profile database 126. It should be appreciated that the return message may be sent to multiple addresses.

The return message may include the recovered data file as an attachment and an acknowledgement confirming that data was recovered and/or purged from the wireless device. In one illustrative embodiment, the application program 124 may be configured to retry a data recovery or purge request until successful. The return message may also include other information requested by the invoking party such as a confirmation that the wireless telephone device was locked or current location information for the wireless telephone 118. It will be appreciated that in one illustrative embodiment, the application program 124 may be configured to split large data recovery files into multiple smaller files which are attached to multiple return messages. For instance, a large address book file may have to be split into multiple smaller files for communication over e-mail systems which limit the file size of attachments. In other illustrative embodiments, the application program 124 may be configured to communicate the recovered data file or files to a data store (such as the customer profile database 126 or the network server 212) where it may be retrieved or "pushed" to a new or recovered wireless device over a communications network. From operation 375, the routine 300 continues to operation 380, where it ends.

Based on the foregoing, it should be appreciated that the various illustrative embodiments of the invention include a system and methods for remotely securing data in a wireless device in a communications network. The above specification, examples and data provide a complete description of the manufacture and use of the composition of the invention. Since many illustrative embodiments of the invention can be made without departing from the spirit and scope of the invention, the invention resides in the claims hereinafter appended.

What is claimed is:

1. A method for remotely securing data, including personal data, in a wireless device in a communications network, the method comprising:

receiving a request for securing the data in the wireless device;

generating a message including request data for communication to the wireless device;

determining a registration status of the wireless device in the communications network;

if the registration status of the wireless device is active, then sending the message to the wireless device for securing the data;

if the registration status of the wireless device is inactive, then storing the message in a pending messages database until the registration status of the wireless device is active; and executing an application program, wherein the application program is operative for:

receiving the message;

parsing the message for the request data, the request data including identification data;

determining whether the identification data in the received message matches identification data resident in the wireless device;

if the received identification data matches the identification data resident in the wireless device, then retrieving the data in the wireless device and sending a return message by accessing a memory in the wireless device and initiating commands to make a copy of the data on the memory, the return message including the data retrieved from the wireless device;

determining whether the request data includes a request to purge the data stored in the wireless device;

if the request data includes a request to purge the data stored in the wireless device, the application program executing a delete command from a menu in the wireless device to purge the data from the wireless device based on the request data, wherein the return message further includes an acknowledgement that the data is purged from the wireless device; and if the request data does not include a request to purge the data stored in the wireless device, the application program refraining from executing the delete command.

2. The method of claim 1, wherein determining a registration status of the wireless device in the communications network comprises polling a registration database for an active record corresponding to the wireless device.

3. The method of claim 2 further comprising periodically polling the registration database to determine when the registration status of the wireless device is active.

4. The method of claim 1 further comprising retrieving an owner information file from the communications network based on the request data, the owner information file comprising identification and location information associated with an owner of the wireless device.

5. The method of claim 4 further comprising executing the retrieved owner information file on the wireless device.

6. A system for remotely securing data, including personal data, in a wireless device in a communications network, the system comprising:

a node operative to receive a request for recovering the data from the wireless device, generate a message including request data for communication to the wireless device, determine a registration status of the wireless device in the communications network, and send the message to the wireless device for securing the data if the registration status of the wireless device is active;

a registration database, in communication with the node and the wireless device, operative to store data pertinent to an operating status of the wireless device; and a pending messages database, in communication with the node, operative to store the message comprising request data for securing the data in the wireless device if the registration status of the wireless device is inactive;

wherein the wireless device is operative to execute an application program and wherein the application program is operative to receive the message from the node, parse the message for the request data, the request data including identification data, determine whether the identification data in the received message matches identification data resident in the wireless device, if the received identification data matches the identification data resident in the wireless device, then retrieve the data in the wireless device and send a return message by accessing a memory in the wireless device and initiating commands to make a copy of the data on the memory, the return message including the data retrieved from the wireless device, determine whether the request data includes a request to purge the data stored in the wireless device, if the request data includes a request to purge the data stored in the wireless device the application program executes a delete command from a menu in the wireless device to purge the data from the wireless device based on the request data, wherein the return message further includes an acknowledgement that the data is purged from the wireless device, if the request data does not include a request to purge the data stored in the wireless device the application program does not execute the delete command.

7. The system of claim 6, wherein the node is operative to determine a registration status of the wireless device by periodically polling the registration database for an active registration record corresponding to the wireless device.

8. The system of claim 6, wherein the registration database is a Home Location Register in a wireless communications network.

9. The system of claim 6, wherein the application program is further operative to lock the wireless device based on the request data, wherein the return message further includes an acknowledgement that the wireless device is locked.

10. The system of claim 6, wherein the application program is further operative to retrieve location information for the wireless device based on the request data, wherein the return message further includes the retrieved location information for the wireless device.

11. The system of claim 6, wherein the application program is further operative to retrieve an owner information file from the communications network based on the request data, the owner information file comprising identification and location information associated with an owner of the wireless device.

12. The system of claim 11, wherein the application program is farther operative to execute the retrieved owner information file on the wireless device.

13. The system of claim 11, wherein the owner information file comprises a graphics file for displaying the identification and location information associated with the owner of the wireless device.

* * * * *